United States Patent
Htay et al.

(10) Patent No.: US 9,806,973 B2
(45) Date of Patent: Oct. 31, 2017

(54) BANDWIDTH ANALYTICS IN A SOFTWARE DEFINED NETWORK (SDN) CONTROLLED MULTI-LAYER NETWORK FOR DYNAMIC ESTIMATION OF POWER CONSUMPTION

(71) Applicants: Aung Htay, Alpharetta, GA (US); Paul Hudgins, Roswell, GA (US); Mallikarjunappa Kore, Alpharetta, GA (US)

(72) Inventors: Aung Htay, Alpharetta, GA (US); Paul Hudgins, Roswell, GA (US); Mallikarjunappa Kore, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 446 days.

(21) Appl. No.: 14/217,825

(22) Filed: Mar. 18, 2014

(65) Prior Publication Data

US 2015/0271043 A1    Sep. 24, 2015

(51) Int. Cl.
| | |
|---|---|
| G06F 15/173 | (2006.01) |
| G05D 3/00 | (2006.01) |
| H04L 12/26 | (2006.01) |
| H04L 12/24 | (2006.01) |

(52) U.S. Cl.
CPC ........ *H04L 43/0876* (2013.01); *H04L 41/147* (2013.01); *Y04S 40/168* (2013.01)

(58) Field of Classification Search
CPC . H04L 43/0888; H04L 43/0876; H04L 43/04; H04L 41/147; Y04S 40/168
USPC .......................................... 709/224; 700/297
See application file for complete search history.

(56) References Cited

U.S. PATENT DOCUMENTS

| | | | |
|---|---|---|---|
| 8,401,710 B2 | 3/2013 | Budhraja et al. | |
| 8,588,991 B1 | 11/2013 | Forbes, Jr. | |
| 2009/0281679 A1* | 11/2009 | Taft | G01D 4/004 |
| | | | 700/297 |

(Continued)

FOREIGN PATENT DOCUMENTS

WO    2013106923 A1    7/2013

OTHER PUBLICATIONS

Ye Yan et al., "A Survey on Smart Grid Communication Infrastructures: Motivations, Requirements and Challenges," IEEE Communications Surveys & Tutorials, Accepted for Publication, Apr. 25, 2011.

*Primary Examiner* — Philip Chea
*Assistant Examiner* — Wing Ma
(74) *Attorney, Agent, or Firm* — Clements Bernard Walker PLLC; Christopher L. Bernard; Lawrence A. Baratta, Jr.

(57) ABSTRACT

A computer-implemented method, a controller, and a Software Defined Network (SDN) perform steps of correlating users based on unique identifiers to service addresses; receiving historical data from associated control area operator for the service addresses; correlating the users' bandwidth usage behavior to the users' power usage behavior; monitoring the users' bandwidth usage over time; characterizing bandwidth usage type for the users with abnormal bandwidth usage patterns; and notifying the control area operator of the users with the abnormal bandwidth usage patterns based on the characterized bandwidth usage type. Accordingly, electric power forecasting by the control area operator can include improved accuracy through correlating the users' bandwidth usage behavior and detecting abnormal conditions.

11 Claims, 18 Drawing Sheets

(56) References Cited

U.S. PATENT DOCUMENTS

| | | | |
|---|---|---|---|
| 2012/0022707 A1* | 1/2012 | Budhraja | H02J 3/008 700/292 |
| 2012/0029720 A1* | 2/2012 | Cherian | H02J 13/00 700/297 |
| 2012/0082048 A1 | 4/2012 | Taft et al. | |
| 2012/0082159 A1 | 4/2012 | Taft et al. | |
| 2012/0226796 A1* | 9/2012 | Morgan | H04L 12/1453 709/224 |
| 2012/0310424 A1* | 12/2012 | Taft | H02J 3/00 700/286 |
| 2012/0310434 A1 | 12/2012 | Taft | |
| 2013/0259465 A1 | 10/2013 | Blair | |
| 2013/0265886 A1 | 10/2013 | Leong et al. | |
| 2013/0310996 A1* | 11/2013 | Boss | G01D 4/00 700/291 |
| 2013/0315580 A1 | 11/2013 | Boertjes et al. | |
| 2013/0318243 A1 | 11/2013 | Chinthalapati et al. | |
| 2013/0326250 A1 | 12/2013 | Sullivan | |
| 2014/0039699 A1* | 2/2014 | Forbes, Jr. | G05B 19/02 700/286 |
| 2014/0215058 A1* | 7/2014 | Vicat-Blanc | H04L 43/14 709/224 |
| 2014/0215077 A1* | 7/2014 | Soudan | H04L 47/11 709/226 |
| 2014/0215465 A1* | 7/2014 | Elzur | G06F 9/45533 718/1 |
| 2014/0280488 A1* | 9/2014 | Voit | H04L 67/10 709/203 |
| 2014/0371941 A1* | 12/2014 | Keller | G06Q 50/10 700/297 |
| 2015/0039734 A1* | 2/2015 | King | H04L 41/0816 709/221 |
| 2015/0039764 A1* | 2/2015 | Beloglazov | H04L 47/70 709/226 |
| 2015/0094871 A1* | 4/2015 | Bhageria | H02J 3/00 700/297 |
| 2015/0135176 A1* | 5/2015 | Kruglick | G06F 9/45533 718/1 |
| 2015/0163162 A1* | 6/2015 | DeCusatis | H04L 43/08 709/224 |
| 2015/0171953 A1* | 6/2015 | Djukic | H04B 7/15507 370/252 |
| 2015/0188837 A1* | 7/2015 | Djukic | H04L 47/70 709/226 |
| 2015/0207677 A1* | 7/2015 | Choudhury | H04L 41/0806 370/254 |
| 2015/0229661 A1* | 8/2015 | Balabine | H04L 43/04 726/22 |
| 2015/0263519 A1* | 9/2015 | Suzuki | H02J 3/005 700/297 |
| 2015/0263906 A1* | 9/2015 | Kasturi | H04L 41/5019 709/224 |

* cited by examiner

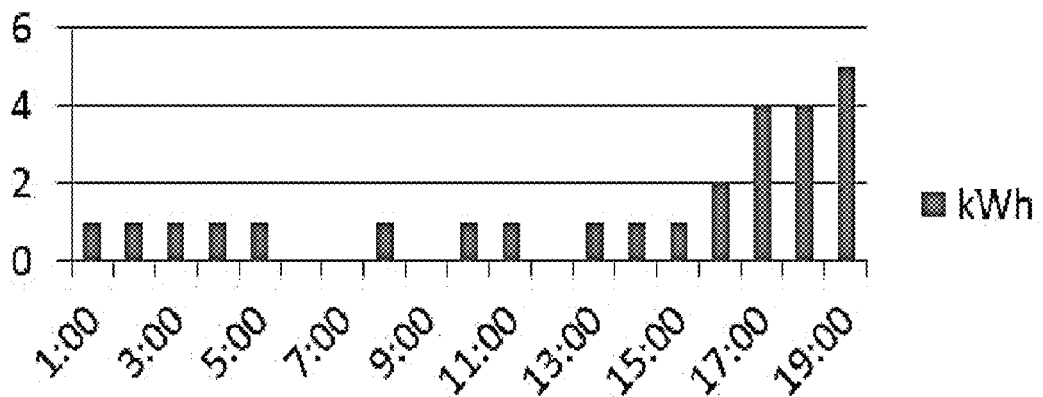
Customer 2 historical power usage pattern for current equivalent day
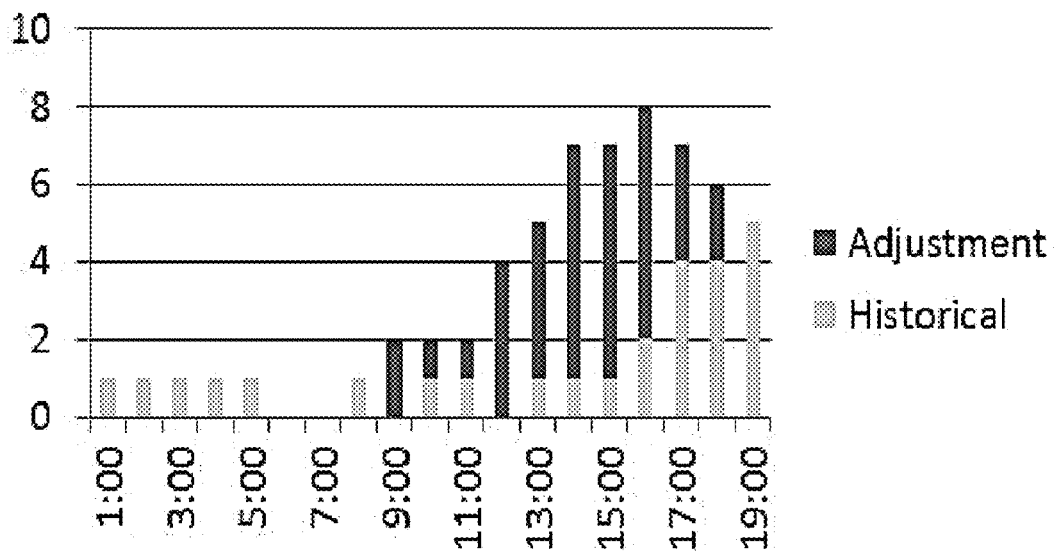
Customer 2 forecast power usage pattern for current day
FIG. 11

Weather History for Atlanta Dekalb, Georgia
Wednesday, January 22, 2014 — View Current Weather Conditions

Wednesday, January 22, 2014

« Previous Day    January ▼ 22 ▼ 2014 ▼ View    Next Day »

Daily | Weekly | Monthly | Custom

| | Actual | Average (KPDK) | Record (KPDK) |
|---|---|---|---|
| Temperature | | | |
| Mean Temperature | 24 °F | 43 °F | |
| Max Temperature | 34 °F | 52 °F | 73 °F (1999) |
| Min Temperature | 14 °F | 33 °F | 14 °F (2014) |

Friday, December 27, 2013

« Previous Day    December ▼ 27 ▼ 2013 ▼ View    Next Day »

Daily | Weekly | Monthly | Custom

| | Actual | Average (KPDK) | Record (KPDK) |
|---|---|---|---|
| Temperature | | | |
| Mean Temperature | 39 °F | 42 °F | |
| Max Temperature | 52 °F | 51 °F | 62 °F (2003) |
| Min Temperature | 26 °F | 33 °F | 24 °F (2002) |
| Degree Days | | | |

FIG. 14

Weather History for Atlanta Dekalb, Georgia
Tuesday, January 21, 2014 — View Current Weather Conditions

BANDWIDTH ANALYTICS IN A SOFTWARE DEFINED NETWORK (SDN) CONTROLLED MULTI-LAYER NETWORK FOR DYNAMIC ESTIMATION OF POWER CONSUMPTION

FIELD OF THE DISCLOSURE

The present disclosure relates generally to computer networking systems and methods. More particularly, the present disclosure relates to Bandwidth analytics in a Software Defined Network (SDN) Controlled Multi-Layer Network for dynamic estimation of power consumption.

BACKGROUND OF THE DISCLOSURE

Electric grid operators are responsible for ensuring that electric supply and demand is always in balance. To meet this responsibility, an interconnected grid is divided into a number of control areas (CA). Electric grid operators monitor any mismatch between generation and load within their responsible control area(s) and continuously adjust supply (generation) to minimize the instantaneous mismatch and to ensure that over time it is near zero. Control areas are clearly defined regions of network topology within which the balancing of generation and load is controlled to ensure system frequency remains within limits. Historically, control areas generally included the assets of individual vertically integrated utilities, but today groups of utility control areas have been integrated into larger footprints and operated at a higher level by Regional Transmission Operators (RTOs). Operators perform Day-Ahead, Current-Day and Hour-Ahead forecasts. See the following websites and screen captures for examples. Referring to FIG. 1, as can be seen in the screen capture taken from the Electric Reliability Council of Texas (ERCOT)'s web site (FIG. 1 is a graph of ERCOT's Load Forecast vs Actual for Jan. 5, 2014), the difference between the actual System Load and the Current-Day Forecast can be as much as 5% (2,500 MW/hour shortage between 19:00 and 24:00 in this example leading to over a 12,500 MW shortage). ERCOT, for example, manages the flow of electric power to 23 million Texas customers. The above estimation error averages to (2,500 MW/23 million customers)=~108 W per customer/per hour for the five hour time period.

Electric grid operators have been deploying Advanced Metering Infrastructure (AMI). The AMI system functions by utilizing a digital meter at customer location that collects, stores and sends near "real time" energy usage data through a communication network connected to a central computer system located at the electric utility. For example, FIGS. 2 and 3 illustrate graphs of household usages based on the AMI. The grid control area operators perform day-ahead, current-day, hour-ahead forecasts but they do not have the capability to represent real-time system operating conditions. Conventionally, the forecasts are based on historical and current system loads and temperatures. Weather data from NOAA National Weather Service stations can be used in the energy use forecast. For the end consumer, "smart" mechanisms to reduce energy consumption are being offered. One such example is the consumer thermostat offered by Nest (www.nest.com). The Nest thermostat utilizes algorithms to automatically set efficient temperatures based on detecting user preferences. While this product benefits the end consumer in lowering their energy bills, it (and other "smart" devices) can provide very accurate data to aid in future power estimates; however such devices are consumer focused.

While electric grid operator forecasting is accurate over time, day-ahead, current-day and in some cases hour-ahead demand can have variation, such as the current forecast differs actual by as much as 5% (in the range of 2500 MW). The shortcoming in electric grid operator forecasting is there is no way of predicting their customer's abnormal usage pattern.

In another area, network operators and service providers are collecting bandwidth usage data to support their data allowance metering (for example, AT&T DSL service 150 G per month, AT&T Uverse service 250 G per month, etc.). When the data allowance is exceeded, AT&T charges $10 per 50 G of data. For example, FIG. 4 illustrates a data trend graph and data usage table for a typical customer. It would be advantageous to leverage the data collected in real-time or near real-time by the network operators and service providers to enhance the electric grid operator forecasting and to particularly address predicting abnormal usage patterns.

BRIEF SUMMARY OF THE DISCLOSURE

In an exemplary embodiment, a computer-implemented method includes monitoring bandwidth usage for a plurality of users in a Software Defined Network (SDN) network, wherein the plurality of users correspond to service addresses in a control area of an electric grid system; detecting abnormal bandwidth usage for a time period for one or more users of the plurality of users; determining whether the abnormal bandwidth usage for the one or more users indicates a power forecast adjustment is needed for the one or more users; and notifying an operator of the control area of the power forecast adjustment based on the determining. The computer-implemented method can further include receiving historical data from the operator of the control area for the plurality of users; correlating bandwidth usage behavior for the plurality of users to power usage behavior for the plurality of users; and determining the power forecast adjustment based on the correlating. The computer-implemented method can further include characterizing bandwidth usage type for the one or more users; and detecting a condition of the one or more users based on the characterizing. The condition can include any of home on a work day, home from school on a school day, away from home, and returning to home. The computer-implemented method can further include correlating the plurality of users based on unique identifiers in the SDN network to the service addresses for the control area. The unique identifiers can include any of Internet Protocol addresses, Media Access Control Address, and Virtual Local Area Network identifiers. The plurality of users can include a subset of users in the control area, and wherein the operator utilizes statistical sampling based on the notifying for the power forecast adjustment. The computer-implemented method can further include adjusting electrical power generation by the operator responsive to the notifying. The computer-implemented method can be implemented by a controller operating an SDN application.

In another exemplary embodiment, a controller includes a network interface, a data store, and a processor, each communicatively coupled therebetween; and memory storing instructions that, when executed, cause the processor to: monitor bandwidth usage for a plurality of users in a Software Defined Network (SDN) network, wherein the plurality of users correspond to service addresses in a control area of an electric grid system; detect abnormal bandwidth usage for a time period for one or more users of the plurality of users; determine whether the abnormal bandwidth usage for the one or more users indicates a power forecast adjustment is needed for the one or more users; and notify an operator of the control area of the power forecast adjustment based on the determining. The instructions that, when executed, can further cause the processor to: receive historical data from the operator of the control area for the plurality of users; correlate bandwidth usage behavior for the plurality of users to power usage behavior for the plurality of users; and determine the power forecast adjustment based on the correlating. The instructions that, when executed, can further cause the processor to characterize bandwidth usage type for the one or more users; and detect a condition of the one or more users based on the characterizing. The condition can include any of home on a work day, home from school on a school day, away from home, and returning to home. The instructions that, when executed, can further cause the processor to correlate the plurality of users based on unique identifiers in the SDN network to service addresses for the control area. The unique identifiers can include any of Internet Protocol addresses, Media Access Control Address, and Virtual Local Area Network identifiers. The plurality of users can include a subset of users in the control area, and wherein the operator utilizes statistical sampling based on the notifying for the power forecast adjustment. The instructions that, when executed, can further cause the processor to adjust electrical power generation by the operator responsive to the notifying. The controller can include an SDN controller operating SDN applications.

In yet another exemplary embodiment, a Software Defined Network (SDN) includes a plurality of network elements providing network access to a plurality of users each uniquely identified by a unique identifier; and a server operating an SDN application and communicatively coupled to the plurality of network elements; wherein the SDN application is configured to: monitor bandwidth usage for the plurality of users, wherein the plurality of users correspond to service addresses in a control area of an electric grid system; detect abnormal bandwidth usage for a time period for one or more users of the plurality of users; determine whether the abnormal bandwidth usage for the one or more users indicates a power forecast adjustment is needed for the one or more users; and notify an operator of the control area of the power forecast adjustment based on the determining.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a graph for power usage of the customer in FIG. 10 in the afternoon of the same day from FIGS. 9 and 10;

FIGS. 13 and 14 are tables of temperature conditions for an exemplary use case of the service provider-based method of FIG. 12;

DETAILED DESCRIPTION OF THE DISCLOSURE

In various exemplary embodiments, the present disclosure relates to Bandwidth analytic systems and methods in a Software Defined Network (SDN) Controlled Multi-Layer Network for dynamic estimation of power consumption. The systems and methods can include a software defined network (SDN), a controller adaption layer, an SDN controller, and an SDN application method to measure the bandwidth usage, to determine the content of the bandwidth, and to improve electric grid system load forecasts in real-time or near real-time. Specifically, with analytics collected in real-time in the SDN, it is possible to forecast abnormal usage patterns. The systems and methods allow service providers to correlate data usage, in both content type and quantity, with a mechanism to accurately predict household power usage in real-time or near real-time. Service providers can offer this information to control area operators on a subscription basis. Control area operators can employ these estimates in their forecasting mechanism in order to fine-tune their power generation, i.e. to accurately predict abnormal usage patterns and accuracy improvements of very small percentages result in large savings.

Figure 5:
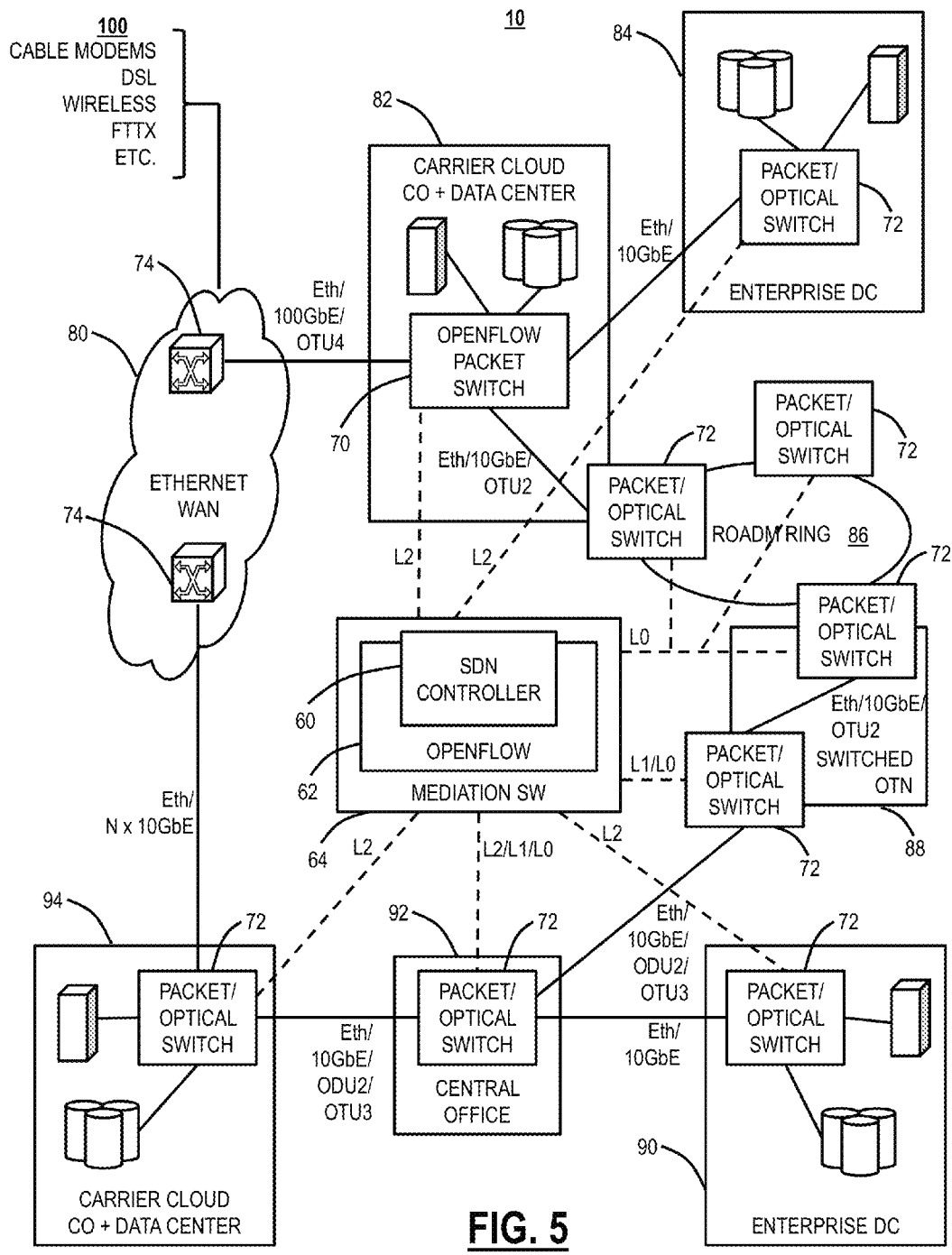
FIG. 5 is a network diagram of an exemplary SDN Internet Service Provider (ISP) network.

Referring to FIG. 5, in an exemplary embodiment, a network diagram illustrates an exemplary SDN Internet Service Provider (ISP) network 10. The ISP network 10 is shown for illustration purposes to describe SDN functionality at Layers 0, 1, 2, and 3. Those of ordinary skill in the art will recognize that any SDN network configuration at Layers 0, 1, 2, and 3 is contemplated. The ISP network 10 is a SDN network which includes an SDN controller 60 with the ability to centrally program provisioning of forwarding in the network 10 in order for more flexible and precise control over network resources to support new services. OpenFlow (www.openflow.org) is an implementation of this which requires a special OpenFlow interface 62 from the SDN controller 60, via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. Other SDN protocols besides OpenFlow are also contemplated with the systems and methods described herein.

Again, for illustration purposes, the ISP network 10 includes an OpenFlow packet switch 70, various packet/optical switches 72, and packet switches 74 with the switches 70, 72 each communicatively coupled to the SDN controller 60 via the OpenFlow interface 62 and the mediation software 64 at any of Layers 0-2 (L0 being DWDM, L1 being OTN, and L2 being Ethernet). The switches 70, 72, 74, again for illustration purposes only, are located at various sites including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. Again, the network 10 is shown just to provide context and typical configurations at Layers 0-3 in an SDN network for illustration purposes.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-2 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., and at Layer 2, the packet/optical switches 72 can provide Ethernet packet switching. An exemplary configuration of the packet/optical switches 72 and the OpenFlow packet switch 70 is illustrated in FIG. 5. The packet switches 74 can be traditional Ethernet switches that are not controlled by the SDN controller 60.

Figure 1:
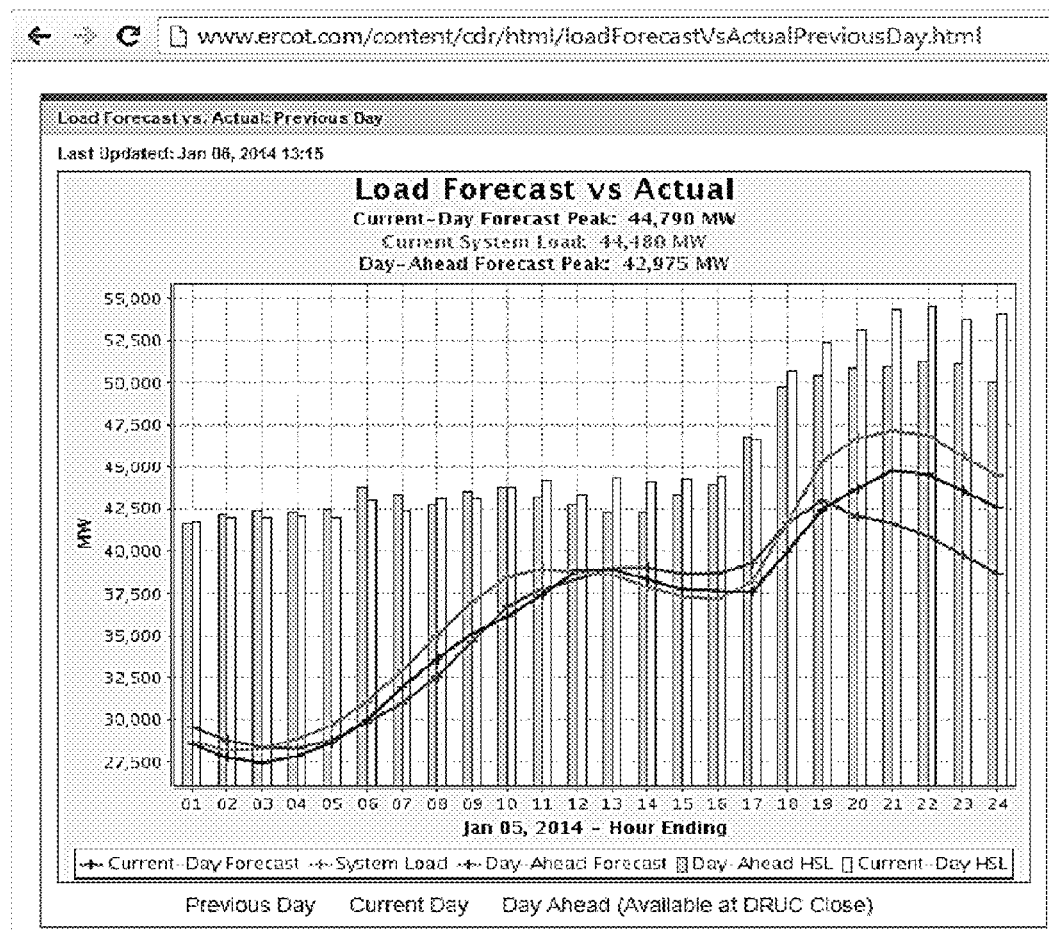
FIG. 1 is a graph of an electrical grid operator's Load Forecast versus Actual for a specific day.
Figure 2:
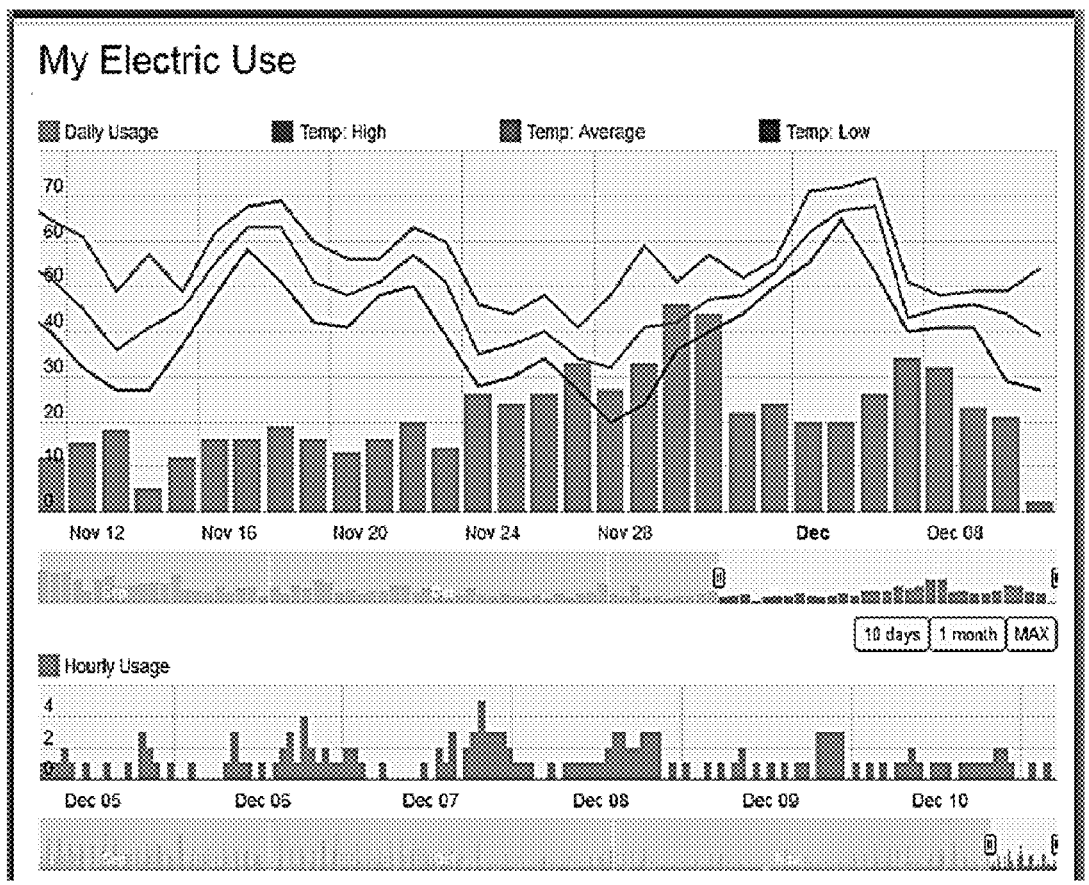
FIGS. 2 and 3 are graphs of household usages for electrical power based on the AMI.
Figure 3:
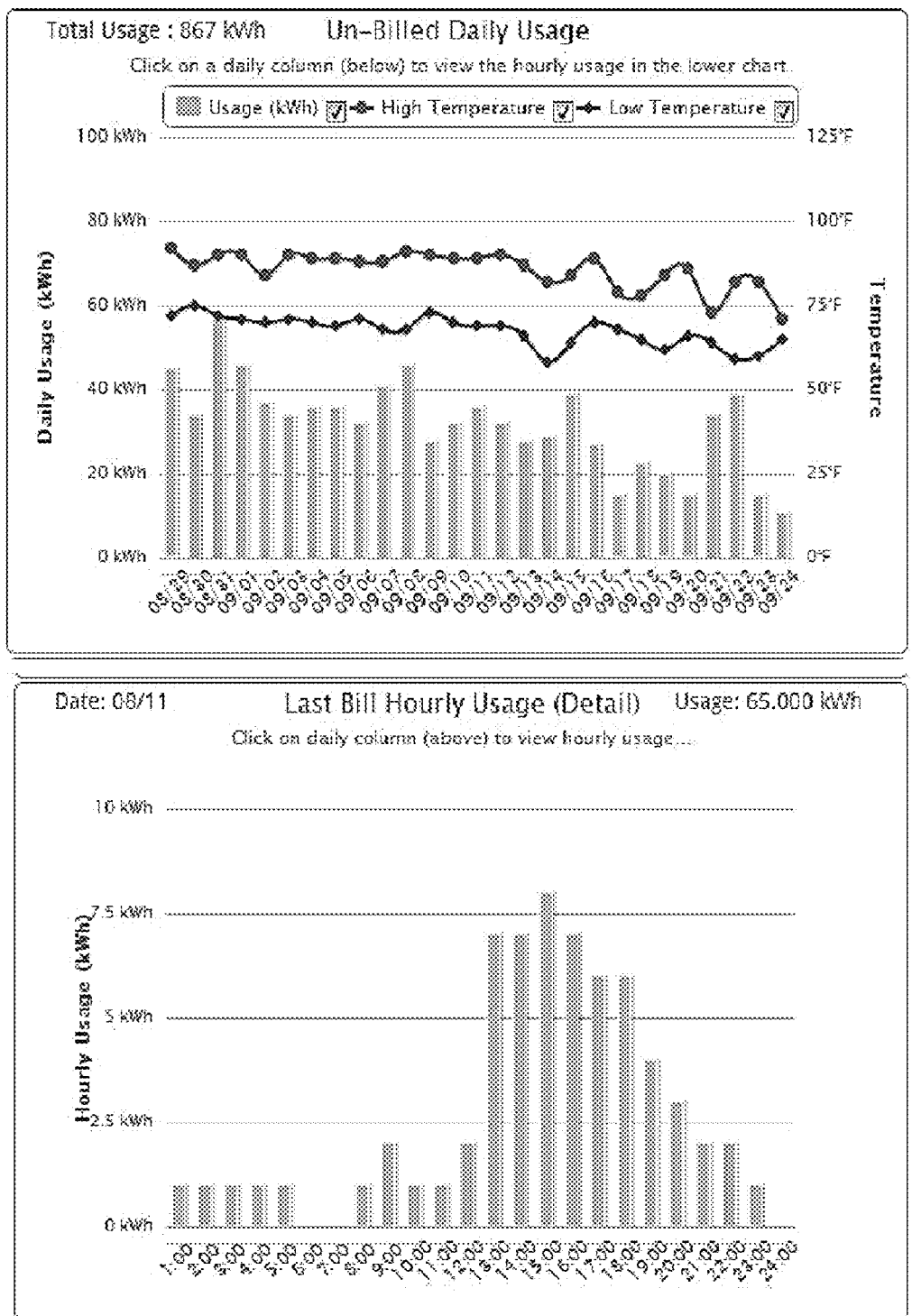
Figure 4:
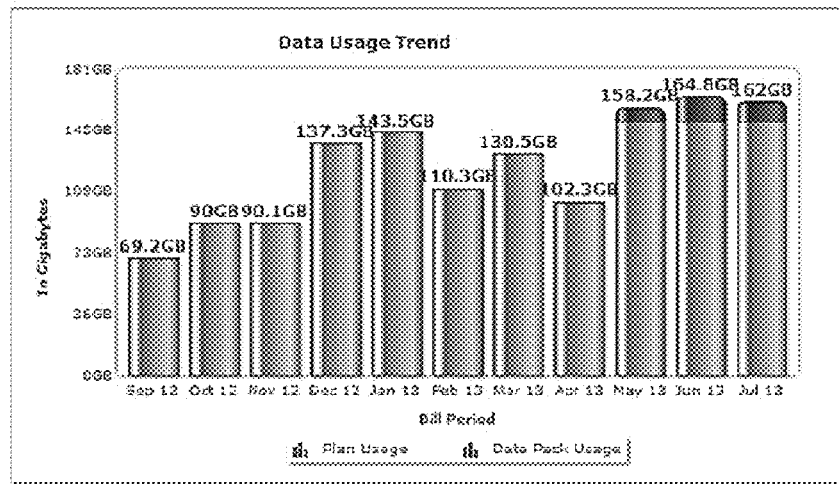
FIG. 4 is a data trend graph and data usage table for a typical customer subscribing to a service provider's network access.

The ISP network 10 can include various end user access technologies 100, such as, without limitation, cable modems, digital subscriber loop (DSL), wireless, fiber-to-the-X (e.g., home, premises, curb, etc.), and the like. In the ISP network 10 and through the SDN controller 60, each end user will have a unique identifier that allows the ISP network 10 to collect analytics such as shown in FIG. 4. In the context of the systems and methods described herein, the SDN controller 60 and associated applications thereon are continually monitoring bandwidth usage over time in the ISP network 10 for each end user and their associated access technologies 100. The unique identifiers can include, without limitation, Internet Protocol (IP) addresses, Media Access Control (MAC) addresses, Virtual Local Area Network (VLAN) identifiers, user account numbers, and the like. In addition to the unique identifiers, the service provider operating the ISP network 10 has a physical location or address associated with each end user, i.e. a service address.

In an exemplary embodiment, the systems and methods include an SDN application which tracks individual end users' real-time or near real-time bandwidth usage, correlates this information with the individual end users' service address, and provides this data, such as via a subscription service, to electrical grid control area operators. In turn, the electrical grid control area operators can utilize this data in their forecasting algorithms in order to fine-tune their power generation, i.e. to accurately predict abnormal usage patterns and accuracy improvements of very small percentages result in large savings. A fundamental aspect of the systems and methods includes the concept that data usage behavior can be an accurate predictor of user behavior as described herein. That is, current data usage behavior is an extremely accurate and easily determined value in the ISP network 10 that can determine abnormal usage behavior (e.g., being home on a weekday from work) that can enable the electrical grid control area operators to plug holes related to abnormal usage behavior in their existing forecasting algorithms.

Figure 6:
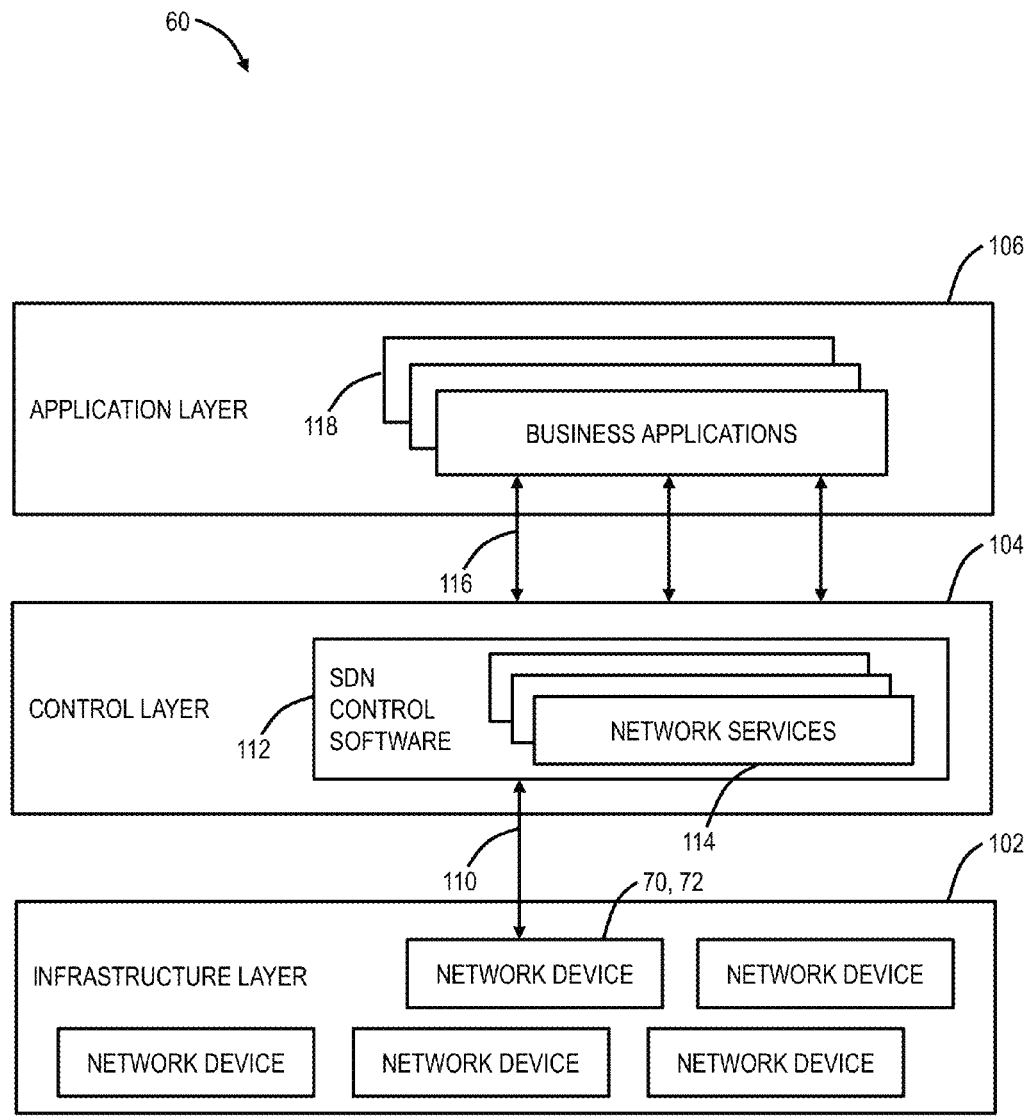
FIG. 6 is a block diagram of functional components of the SDN controller in the SDN network of FIG. 5.
Figure 7:
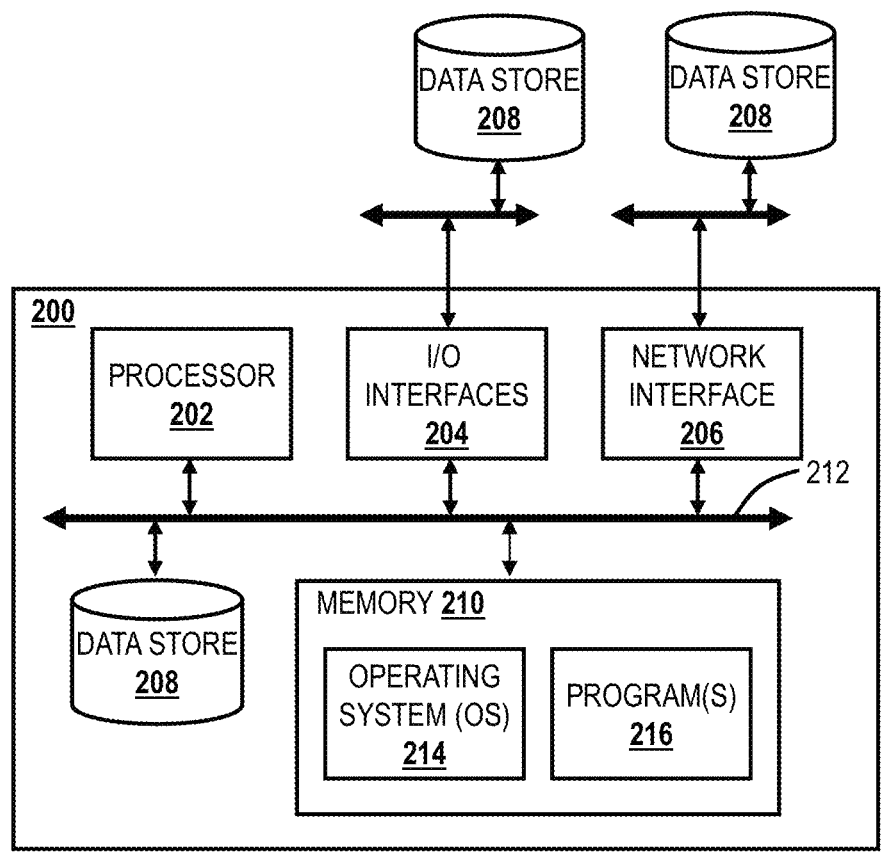
FIG. 7 is a block diagram of a server which may be used for the SDN controller of FIG. 6.

Referring to FIG. 6, in an exemplary embodiment, a block diagram illustrates functional components of the SDN controller 60. The SDN controller 60 can be a server or the like such as illustrated in FIG. 7 and the functional components can be implemented in software executed on the server. The SDN controller 60 includes an infrastructure layer 102, a control layer 104, and an application layer 106. The infrastructure layer 102 is communicatively coupled to network devices such as the switches 70, 72 via a control plane interface 110 such as OpenFlow. The infrastructure layer 102 allows communication between the SDN controller 60 and the network devices. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN such as software modules and/or functions responsible for creating desired path and flow connections on the physical network through various business applications 118. In an exemplary embodiment, the systems and methods for dynamic estimation of power consumption are implemented as one of the business applications 118.

Referring to FIG. 7, in an exemplary embodiment, a block diagram illustrates a server 200 which may be used to realize the SDN controller 60, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 7 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductorbased microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 1208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Figure 8:
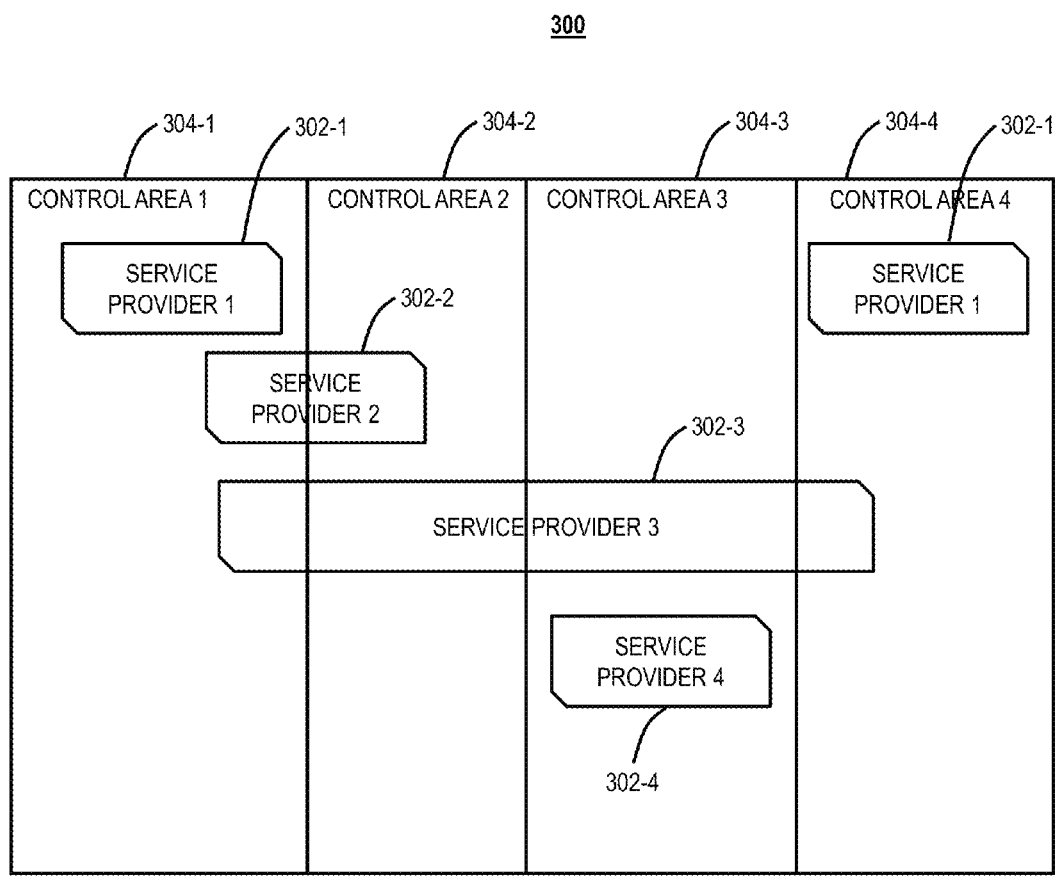
FIG. 8 is a logical diagram of an electrical grid network overlaid with associated service providers.

Referring to FIG. 8, in an exemplary embodiment, a logical diagram illustrates an electrical grid network 300 overlaid with associated service providers 302. The logical diagram is meant to convey geographical location. The electrical grid network 300 is divided into control areas 304. In this exemplary embodiment, for illustration purposes, the electrical grid network 300 includes four control areas 304-1, 304-2, 304-3, 304-4 each being a geographic area that is serviced by an electrical operator. The electrical grid network 300, from an ISP perspective, is serviced by four exemplary service providers 302-1, 302-2, 302-3, 302-4. FIG. 8 illustrates the logical division of the control areas 304-1, 304-2, 304-3, 304-4, and the service providers can span multiple control areas. However, it is noted that the service providers 302-1, 302-2, 302-3, 302-4, taken collectively, substantially cover all of the electrical grid network 300 geographically.

Again, the goal of each control area operator is to generate exactly the amount of power needed with no waste or shortage. To achieve this goal, day-ahead and current day and/or hour-ahead forecasts are calculated using proprietary systems. Even with historical data and environmental (e.g. temperature) data, the forecast and actual system load can easily differ by 5% (2,500 MW) in one operator. This inability to account for "abnormal" or non-deterministic customer behavior drives a significant portion of this missed estimation. Thus, the systems and methods provide a forecasting service from the service providers 302-1, 302-2, 302-3, 302-4, to operators of the control areas 304-1, 304-2, 304-3, 304-4 as described herein.

For illustration purposes, it is expected that the service providers 302-1, 302-2, 302-3, 302-4 run the systems and methods described herein, such as in their SDN controller, and provide forecasting service to the control area operators. The control area 304-1 operator can subscribe to the forecasting service from the service providers 302-1, 302-2, 302-3. The subscription implies that control area 304-1 operator makes their customers' historical power usage data and/or their forecasts available to the service providers 302-1, 302-2, 302-3.

Figure 9:
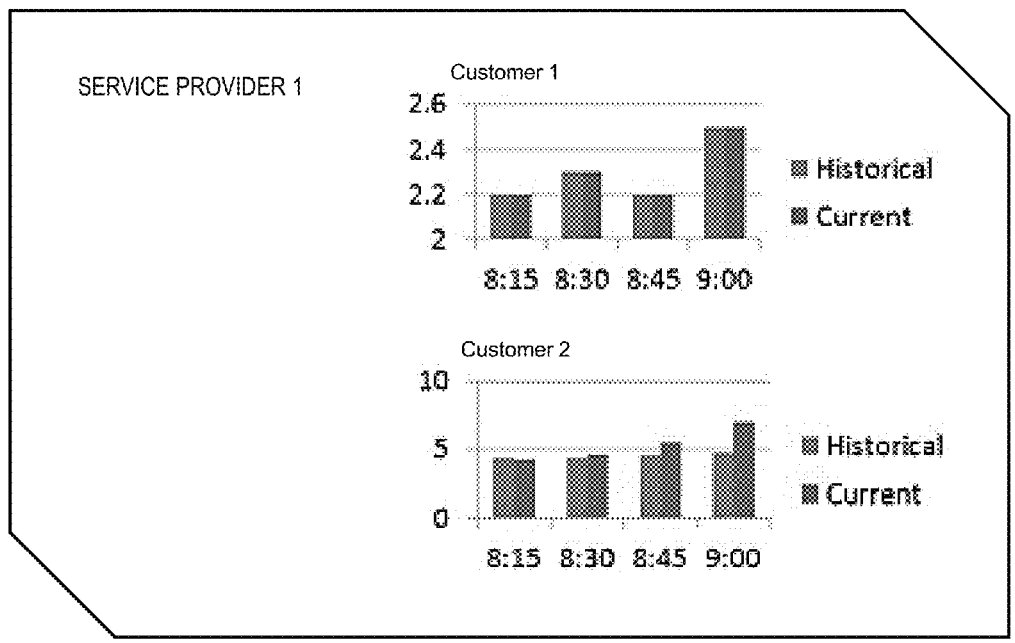
FIG. 9 are graphs of exemplary customers in a service provider's network overlapping a control area in the electrical grid network of FIG. 8 illustrating historical and current data usage.
Figure 10:
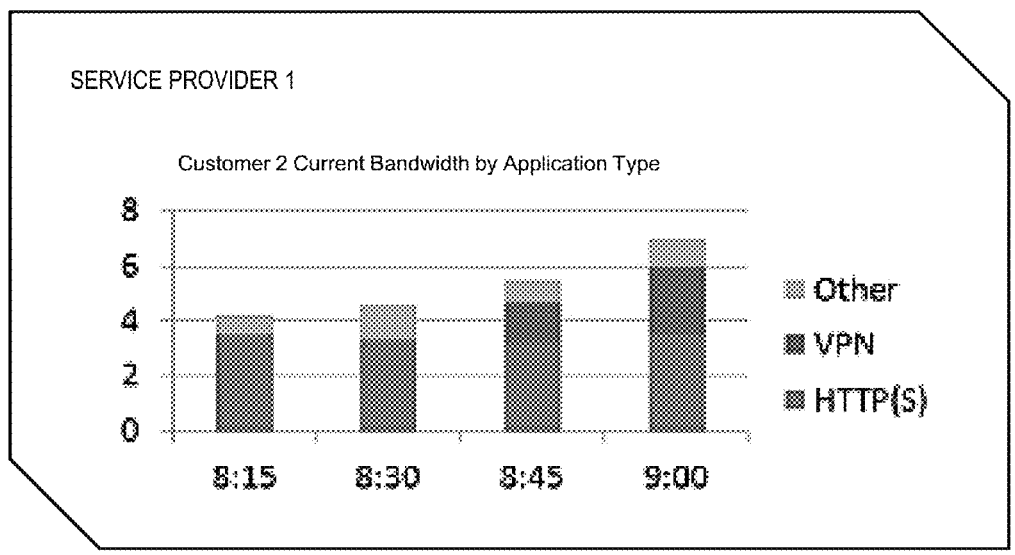
FIG. 10 is a graph of one of the customers in FIG. 9 with abnormal behavior characterizing the current data usage.

When the control area 304-1 operator subscribes to the forecasting service from the service providers 302-1, 302-2, 302-3, these service providers 302-1, 302-2, 302-3 start using the forecasting service to measure and characterize their customers' bandwidth usage. For example, consider customers 1 and 2 are served by the service provider 302-1. Note, practical embodiments of the forecasting service likely will include thousands of customers or more, but for ease of illustration, the customers 1 and 2 are described herein. In this case, the service provider 302-1 measures and characterizes customers 1 and 2's bandwidth usage, such as illustrated in FIG. 9, for example in 15 minute increments although other granularities are also contemplated. At the end of each measure period (15 min shown here), the customer bandwidth usage is compared against the historical behavior. For customer 1, there is no significant change detected. The service provider 302-1 marks the customer 1 as normal and power consumption; forecast adjustment is not needed. For the customer 2, there is a significant change detected. The service provider 302-1 can further characterize the current bandwidth usage for the customer 2, such as illustrated in FIG. 10.

By comparing historical data for the customer 2, it is recognized that the increase in bandwidth usage was due to the Virtual Private Network (VPN) traffic. The service provider 302-1 marks the customer 2 as abnormal and power consumption adjustment is needed by the control area 304-1 operator. For example, the VPN traffic can be indicative of the customer 2 working from home. From historical data, the service provider 302-1 decides that the customer 2 is most likely to continue the VPN traffic until 17:00, i.e. the customer 2 is likely working from home. The service provider 302-1 up the historical power usage pattern for customer 2 from the control area 304-1 operator provided data. The forecasting system predicts the power usage for the next period and provides the data to the control area 304-1 operator. For example, FIG. 11 illustrates a graph for the customer 2 in the afternoon of the same day from FIGS. 9 and 10. Note, the historical power usage for an equivalent day has the customer 2 away at work during the day with power usage increasing around 17:00. However, in the current day where the customer 2 is using VPN traffic at home in the morning, a power adjustment over the historical power is needed all day. Again, while this is illustrated solely for the customers 1 and 2, those of ordinary skill in the art will recognize across hundreds or thousands of customers, the forecasting service can streamline forecasting algorithms to more accurately detect abnormal conditions.

The forecasting service can work with a number of factors to characterize and adjust the control area operator's forecast. For example, using FIGS. 9-11, exemplary factors can include:

Day of the week. For example, it is Monday.
Is it a school day? Yes.
Does the historical bandwidth usage indicate that normal bandwidth usage? No.
Does the current bandwidth characterization indicate continued abnormal usage? Yes.
Retrieve the customer's (customer 2 in this example) forecast based on historical power usage for an equivalent normal day. That is a Monday, school day with the outside temperature in the same range. For example, between 9:00 and 17:00, the expected power usage is around 1 kWh.
Retrieve the customer's forecast historical power usage for the day (with equivalent outside temperature and home owner present).
Make adjustment to the forecast for the customer's power usage. For example at 9:00, instead of <1 kWh normal, predict a 2 kWh usage based on historical data analysis.
Provide this delta information between normal and abnormal usage to the control area operator (operator 1 in this example).

The control area 304-1 operator utilizes the service provider 302-1 provided data, and makes the incremental adjustment to its forecast for the next period. Since the control area 304-1 operator may not receive estimated usage for all of its customers, a statistical analysis of the provided samples can allow a more accurate estimate than without this information. For example, using the forecasting service, it is not necessary for the control area 304-1 operator to receive data for all of the customers, but rather a statistical sample is more than enough to improve forecasting accuracy.

Figure 12:
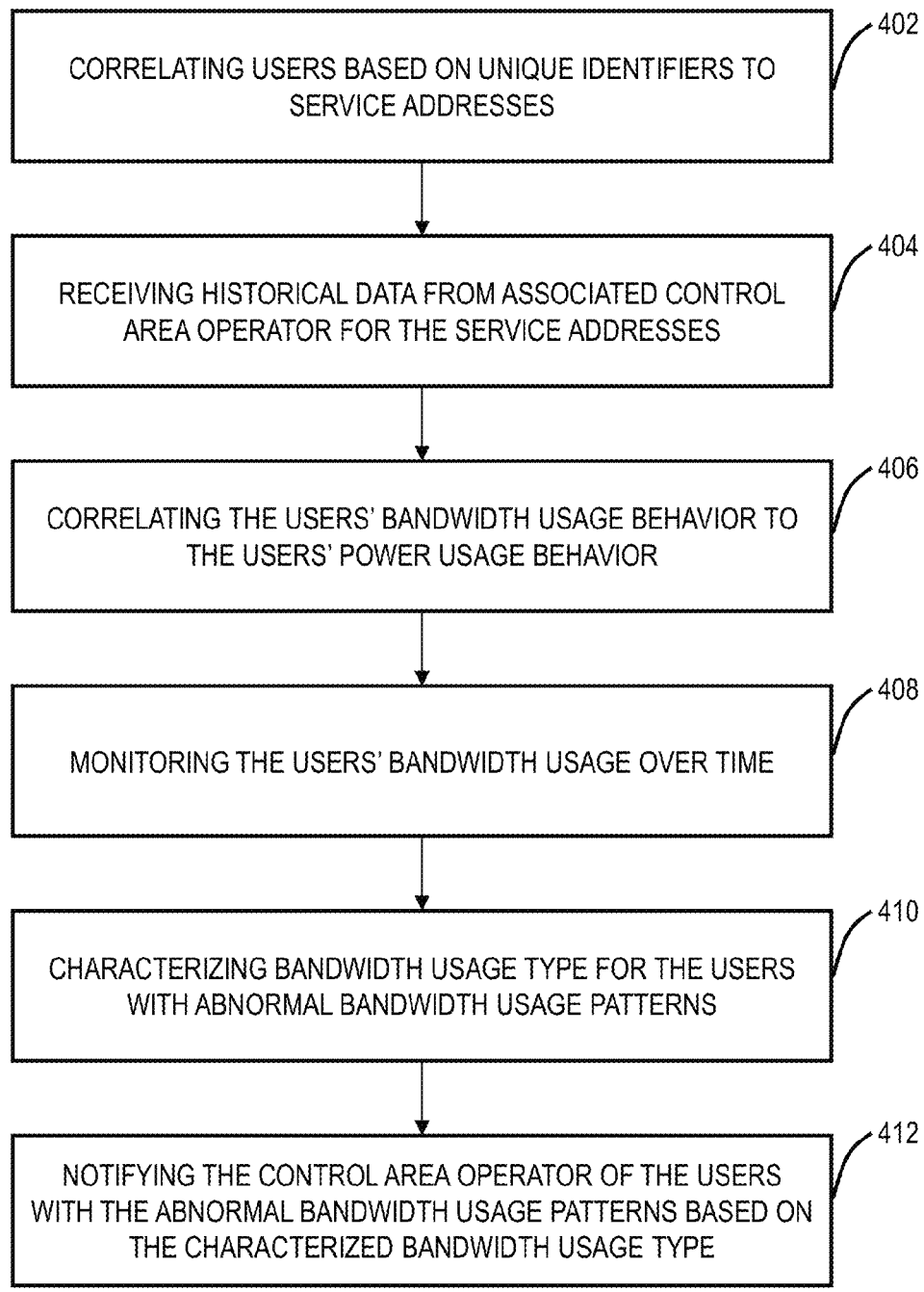
FIG. 12 is a flowchart of a service provider-based method for dynamic estimation of power consumption based on correlating current data usage.

Referring to FIG. 12, in an exemplary embodiment, a flowchart illustrates a service provider-based method 400 for dynamic estimation of power consumption based on correlating current data usage. The service provider-based method 400 can be implemented by the service providers 302-1, 302-2, 302-3, 302-4 such as through the SDN controller 60 and an associated business application 118. The service provider-based method 400 includes correlating users based on unique identifiers to service addresses (step 402). Here, the service provider has a correlation between a unique identifier on the service provider's network (e.g., IP address, MAC address, VLAN ID, etc.) and a physical service address. This is important as the objective of the service provider-based method 400 is to detect abnormal bandwidth usage at a particular time and provide this information to a control area operator so that the abnormal bandwidth usage can be used to adjust forecasting based on the physical service address.

The service provider-based method 400 includes receiving historical data from associated control area operator for the service addresses (step 404). The service provider-based method 400 can be a subscription service that is subscribed to by the associated control area operator. Here, the associated control area operator is configured to provide data to the service provider of historical power usage for the service addresses. The service provider can store this information and use it later for charactering the bandwidth usage to detect abnormal behavior. Additionally, the service provider can request this information on an ongoing basis, such as upon detecting an abnormality for a particular customer. With the historical power usage, the service provider also has historical bandwidth usage since the service provider provides network access to the customers. As such, the service provider-based method 400 includes correlating the users' bandwidth usage behavior to the users' power usage behavior (step 406). Here, the service provider adapts guidelines for normal and abnormal behavior, from a power usage perspective, based on bandwidth usage. There are numerous parameters which can be accounted for here such as, for example, day of the week, school day or not, average temperature, and the like.

The service provider can build an expectation for the customers—on a weekday during the school year, this customer expects to do X power based on the bandwidth usage. Now, if the service provider notices a change in the bandwidth usage on a similarly situated day, the service provider can expect that the X power may not be accurate. This is how bandwidth usage is tied to power usage. Bandwidth usage is a convenient metric that is already tracked in real-time or near real-time for other purposes, e.g. metering, statistical multiplexing, etc. The systems and methods utilize this convenient metric to further improve power usage forecasting. Stated differently, bandwidth usage can give an indication of user activity at the service address—e.g., streaming video/audio may lead to an indication the customers are home being entertained, VPN connectivity may lead to an indication the customers are working from home, and the like. Such indicators are not available in the context of the AMI and power usage.

The service provider-based method 400 includes monitoring the users' bandwidth usage over time (step 408). The steps 402, 404, 406 are generally preparation steps that are performed offline or before (although the steps 404, 406 can also be performed on an ongoing basis as well). The step 408 is an ongoing monitoring step where the service provider is looking at individual customers to detect abnormal behavior in bandwidth usage that could lead to different power usage from expected. This is the information that the service provider seeks to convey to the control area operator to streamline the power usage forecasting.

The service provider-based method 400 includes characterizing bandwidth usage type for the users with abnormal bandwidth usage patterns (step 410). Here, for customers outside an expected range on a particular day or for a particular time period, the service provider-based method 400 looks to seek if some information can be gleaned from the abnormal bandwidth usage patterns. Various abnormal bandwidth usage patterns can include, for example, working from home on a work day, home from school on a school day, away on vacation, returning from vacation, etc. These abnormal bandwidth usage patterns are something the control area operators are unaware of in their power usage forecasts, but can be detected by the service provider and relayed to the control area operators. As such, the service provider-based method 400 includes notifying the control area operator of the users with the abnormal bandwidth usage patterns based on the characterized bandwidth usage type (step 412).

Again, for a particular day and/or a particular time period, the service provider notifies the control area operator of various customers who are exhibiting abnormal patterns. This can also include various categories of the abnormal patterns (working from home on a work day, home from school on a school day, away on vacation, returning from vacation, etc.). The control area operator can include this information in their forecasting model to improve accuracy. Note, the control area operator may receive this information for a sampling of the customers, and develop statistical models based thereon. Also, it is not impractical for the control area operator and the service provider to exchange this information about a large subset of the customers or even all of the customers.

The service provider-based method 400 is described as follows with two exemplary use cases. These are presented for illustration purposes, and those of ordinary skill in the art will appreciate other use cases are also contemplated. In the following scenarios, it is assumed that the control area operator and the service provider are engaged in business-to-business (B2B) relationship, i.e. the service provider utilizes one of more of the servers 200 to implement the service provider-based method 400 and the control area operator utilizes one of more of the servers 200 to implement a forecasting algorithm, and each of the servers 200 from the service provider and the control area operator are communicatively coupled there between for data exchange. Again, the service providers utilize the systems and methods to perform analytics on the customers' historical data and each customer is associated with a specific bandwidth usage profile.

In a first use case, a first customer's bandwidth usage is profiled using historical usage data as follows:

Substantially no bandwidth is used between the hours of 11 pm to 6 am.

During school days, normally, substantially no bandwidth is used between 7 am to 4 pm.

On other days, bandwidth usage occurs between 6 am to 11 pm.

Daily bandwidth usage range from 0.62 Gb/s to 7.54 Gb·s.

Multiple bandwidth streams detected.

The first customer's thermostats are programmed by the customer (settings for winter) as follows:

Thermostat 1—Upstairs, located in the hallway, at the top of the staircase.

| Wake | 5:15 am | Heat 68 F. |
|---|---|---|
| Leave | 8:00 am | Heat 60 F. |
| Return | 4:30 pm | Heat 68 F. |
| Sleep | 10:00 pm | Heat 67 F. |

Thermostat 2—Downstairs, located in the front door entry way.

| Wake | 6:00 am | Heat 66 F. |
|---|---|---|
| Leave | 8:00 am | Heat 58 F. |
| Return | 4:00 pm | Heat 66 F. |
| Sleep | 9:00 pm | Heat 61 F. |

Data, by the service provider, was captured for the first customer and analyzed for Jan. 22, 2014 at 9:00, 10:00, 11:00, 12:00 and 13:00. On Jan. 22, 2014, bandwidth usage amount of 25,464,526 bytes was detected at 9:05. The first customer's profile indicated abnormality, which can trigger the service provider-based method 400 to perform a power usage forecast for the 9th hour. The service provider-based method 400 can request (or already have) the first customer's power usage histories from control area operator for the 9th hour and with similar conditions such as temperature [e.g. @ 16 F]. The usage history for both customer normal/presence and customer away were or could be provided by the control area operator. The customer normal/presence was determined to be a most recent past no school weekday with a similar temperature profile. Note, the service provider can also know the current conditions such as type of day (school day, work day, holiday, weekend, etc.), temperature, etc. For example, FIG. 13 illustrates conditions at the service address for the first customer on Jan. 22, 2014 whereas FIG. 14 illustrates conditions at the service address for a similar day (no school) for the purposes of forecasting "normal/presence".

Figure 15:
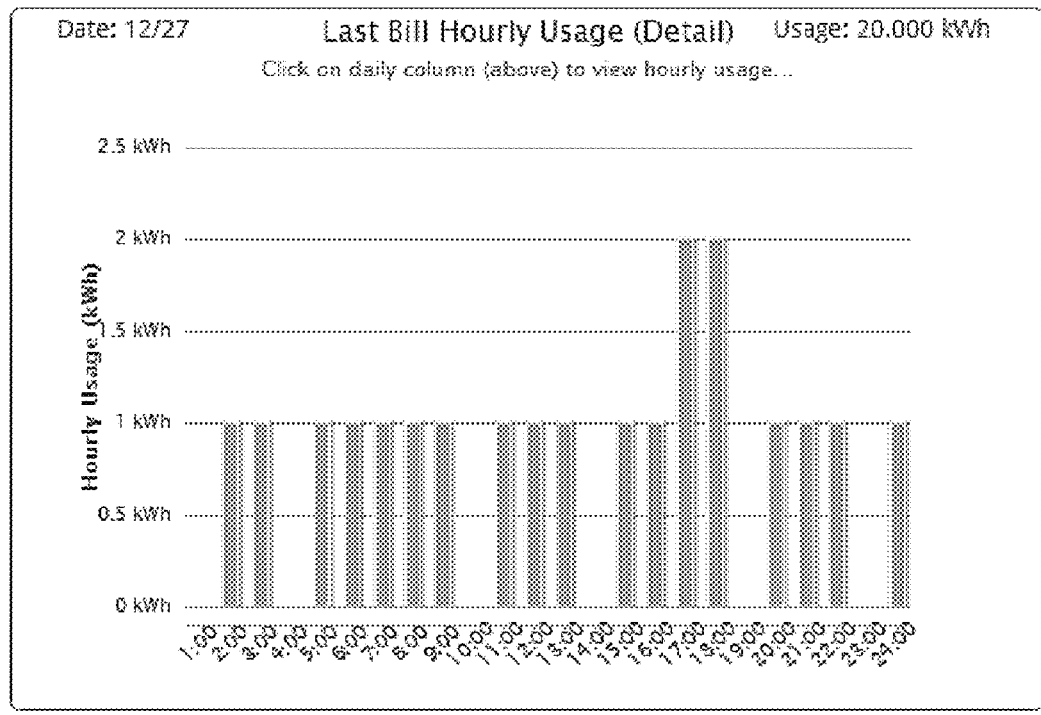
FIG. 15 is a graph of historical normal/presence hourly power usage provided by the control area operator for the exemplary use case of FIGS. 13 and 14.
Figure 16:
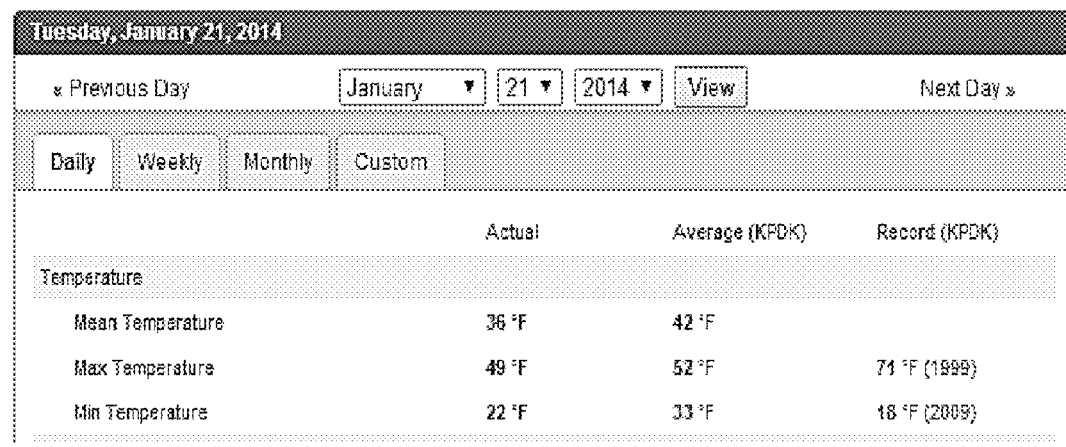
FIG. 16 is a table of temperature conditions for a similar most recent past day used by the control area operator for "away" (school day), for the purpose of forecasting for the exemplary use case of FIGS. 13-15.
Figure 17:
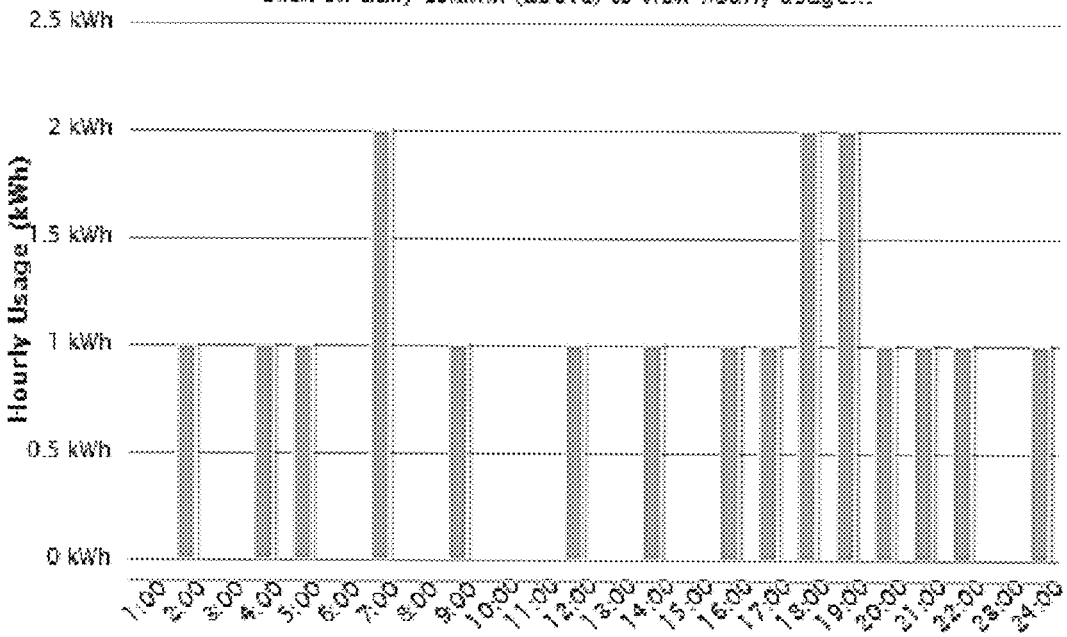
FIG. 17 is a graph of historical away hourly power usage provided by the control area operator for the exemplary use case of FIGS. 13-16.

FIG. 15 illustrates exemplary historical normal/presence hourly power usage [temperature 16 F] provided by the control area operator for the first customer. FIG. 16 illustrates conditions for a similar most recent past day used by the control area operator for "away" (school day), for the purpose of forecasting. FIG. 17 illustrates exemplary historical away hourly power usage [temperature 16 F] provided by the control area operator for the first customer. The service provider-based method 400 already determined that the first customer was normal/presence because of unexpected bandwidth usage at 9:05. Using data provided by the control area operator, it would forecast 1 kWh usage for 9th hour. That is no adjustment is needed because FIG. 15 matches FIG. 17 for the 9th hour.

On Jan. 22, 2014, bandwidth usage amount of 9,764,158 bytes was detected at 10:07. Using a similar procedure, it would forecast 0 kWh usage for the 10th hour. That is no adjustment is needed. Again, FIG. 15 matches FIG. 17 for the 10th hour.

On Jan. 22, 2014, bandwidth usage amount of 6,958,560 bytes was detected at 11:06. Using a similar procedure, it would forecast 1 kWh usage for the 11th hour. That is adjustment of 1 kWh is needed based on the provided forecast data. For example, FIG. 15 shows 1 kWh usage for the 11th hour whereas FIG. 17 shows 0 kWh usage for the 11th hour thereby indicating the adjustment of 1 kWh is need for the 11th hour for the first customer.

On Jan. 22, 2014, bandwidth usage amount of 16,631,597 bytes was detected at 12:06. Using a similar procedure, it would forecast 1 kWh usage for the 12th hour. That is no adjustment is needed. Again, FIG. 15 matches FIG. 17 for the 12th hour.

On Jan. 22, 2014, bandwidth usage amount of 3,118,260 bytes was detected at 13:06. Using a similar procedure, it would forecast 1 kWh usage for the 13th hour. That is adjustment of 1 kWh is needed. For example, FIG. 15 shows 1 kWh usage for the 13th hour whereas FIG. 17 shows 0 kWh usage for the 13th hour thereby indicating the adjustment of 1 kWh is need for the 13th hour for the first customer.

The service provider-based method 400 based on detecting the abnormal bandwidth usage as a proxy for normal/presence energy usage, is able to forecast a 2 kWh accuracy over the 5 hour period. Again, this would not be possible using the historical power usage plus temperature forecasting alone as currently used by the control area operators. Results for this use case are illustrated in the following table:

|  | 9:00 | 10:00 | 11:00 | 12:00 | 13:00 |
| --- | --- | --- | --- | --- | --- |
| Without the service provider-based method 400 | 1 kWh | 0 kWh | 0 kWh | 1 kWh | 0 kWh |
| With the service provider-based method 400 | 1 kWh No adjustment | 0 kWh No adjustment | 1 kWh Adjustment of 1 kWh | 1 kWh No adjustment | 1 kWh Adjustment of 1 kWh |
| Actual | 1 kWh | 0 kWh | 1 kWh | 1 kWh | 1 kWh |

For a second use case, a second customer has a bandwidth usage profile using historical usage data as follows:
Bandwidth usage is detected daily between 8 am to midnight.
Daily bandwidth usage range from 0.2 G to 2.3 G.
Multiple bandwidth streams detected.

This second use case is substantially the inverse of first use case. In this second use case, the service provider-based method 400 detects no bandwidth usage and employs the "away" energy usage forecast. In this household, when normal/presence, the energy usage is 1 kWh at most hours and no more than 2 hours with 0 kWh.

Figure 18:
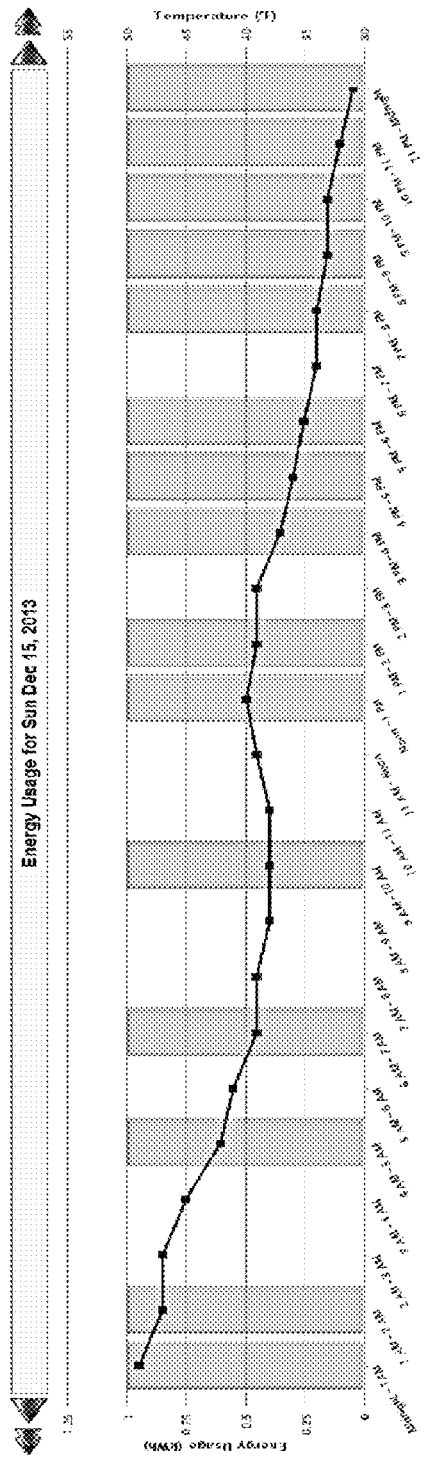
FIGS. 18-22 are graphs of hourly power usage provided by the control area operator for a second use case.
Figure 19:
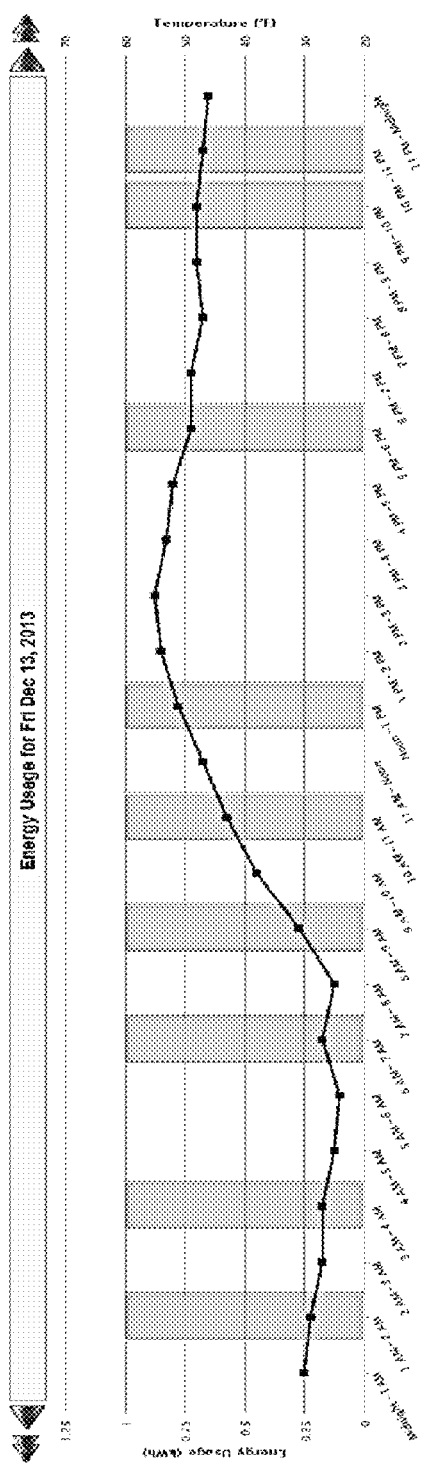
Figure 20:
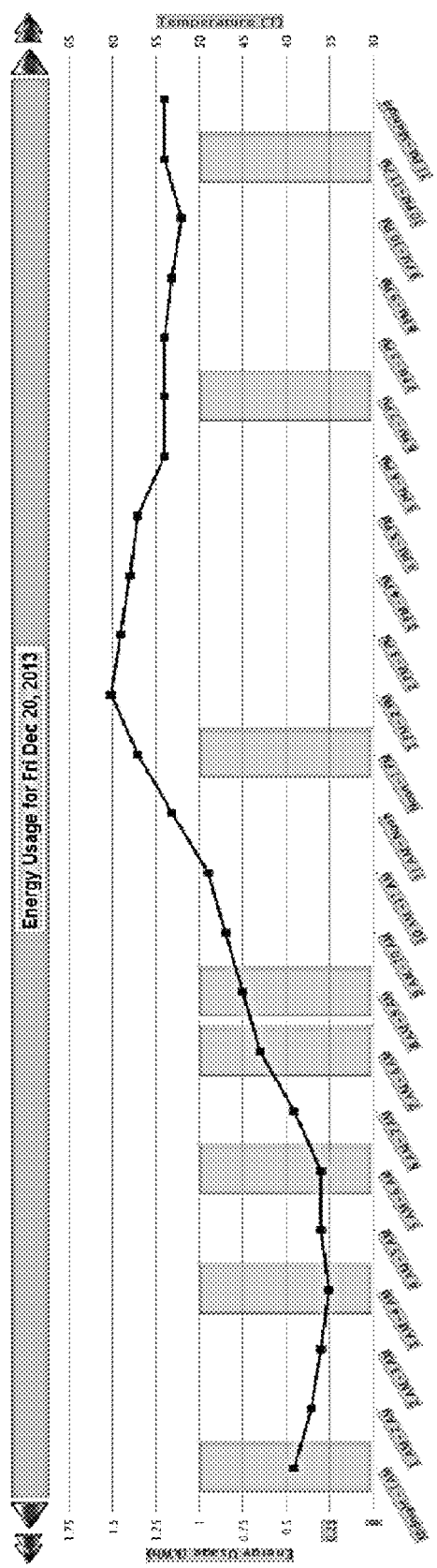
Figure 21:
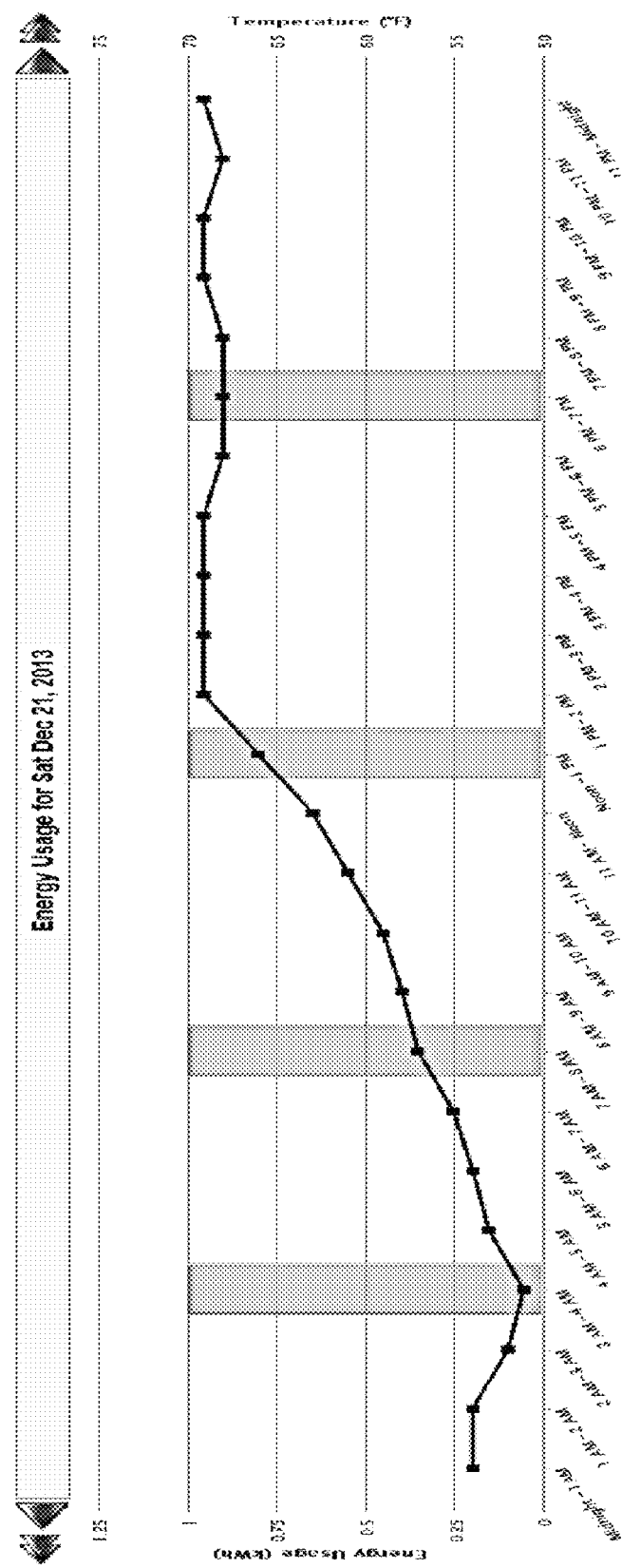
Figure 22:
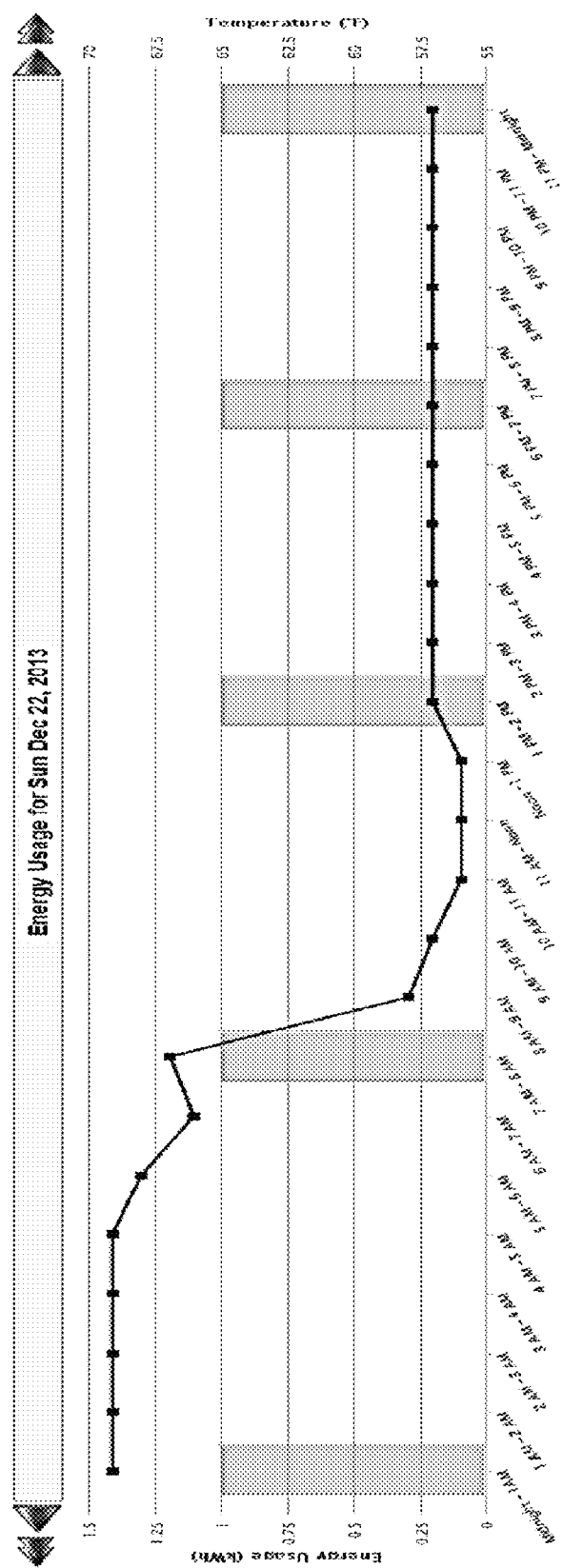

FIG. 18 is a graph of power usage for the second customer with normal/presence for the whole day on Dec. 15, 2013. When the second customer is away, the power usages is less than 1 kWh for more than two hours at a time. For example, FIG. 19 is a graph of power usage with the second customer away from 1 pm to 10 pm on Dec. 13, 2013. FIG. 20 is a graph of power usage with the second customer away starting at 9 am on Dec. 20, 2013. FIGS. 21 and 22 are graphs of power usage with the second customer away the whole day on Dec. 21, 2013 and Dec. 22, 2013, respectively. Given this power usage profile for the second customer, the service provider-based method 400 is able to provide away forecast by detecting when the second customer is away based on bandwidth usage.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method, comprising:
monitoring bandwidth usage for a plurality of users in a Software Defined Network (SDN) network, wherein the plurality of users correspond to service addresses in a control area of an electric grid system;
detecting abnormal bandwidth usage for a time period for one or more users of the plurality of users on the SDN network, which is a service provider network separate from the electric grid system;
determining whether the abnormal bandwidth usage for the one or more users indicates a power forecast adjustment is needed for the one or more users, wherein the determining is based on correlating bandwidth usage behavior for the plurality of users to power usage behavior for the plurality of users and basing the power forecast adjustment thereon;
notifying an operator of the control area of the power forecast adjustment based on the determining such that the operator adjusts power generation based on the notifying, wherein the plurality of users comprises a subset of users in the control area, and wherein the operator utilizes statistical sampling based on the notifying for the power forecast adjustment;
characterizing bandwidth usage type for the one or more users; and
detecting a condition of the one or more users based on the characterizing, wherein the condition comprises any of home on a work day, home from school on a school day, away from home, and returning to home.

2. The computer-implemented method of claim 1, further comprising:
receiving historical data from the operator of the control area for the plurality of users.

3. The computer-implemented method of claim 1, further comprising:
correlating the plurality of users based on unique identifiers in the SDN network to the service addresses for the control area.

4. The computer-implemented method of claim 3, wherein the unique identifiers comprise any of Internet Protocol addresses, Media Access Control Address, and Virtual Local Area Network identifiers.

5. The computer-implemented method of claim 1, wherein the computer-implemented method is implemented by a controller operating an SDN application.

6. A controller, comprising:
a network interface, a data store, and a processor, each communicatively coupled therebetween; and
memory storing instructions that, when executed, cause the processor to:
monitor bandwidth usage for a plurality of users in a Software Defined Network (SDN) network, wherein the plurality of users correspond to service addresses in a control area of an electric grid system;
detect abnormal bandwidth usage for a time period for one or more users of the plurality of users on the SDN network, which is a service provider network separate from the electric grid system;
determine whether the abnormal bandwidth usage for the one or more users indicates a power forecast adjustment is needed for the one or more users, wherein the power forecast adjustment is determined based on a correlation of bandwidth usage behavior for the plurality of users to power usage behavior for the plurality of users and the power forecast adjustment is based thereon;
notify an operator of the control area of the power forecast adjustment based on the abnormal bandwidth usage such that the operator adjusts power generation based on the notifying, wherein the plurality of users comprises a subset of users in the control area, and wherein the operator utilizes statistical sampling based on the notification for the power forecast adjustment
characterize bandwidth usage type for the one or more users; and
detect a condition of the one or more users based on the characterized bandwidth, wherein the condition comprises any of home on a work day, home from school on a school day, away from home, and returning to home.

7. The controller of claim 6, wherein the instructions that, when executed, further cause the processor to:
receive historical data from the operator of the control area for the plurality of users.

8. The controller of claim 6, wherein the instructions that, when executed, further cause the processor to:
correlate the plurality of users based on unique identifiers in the SDN network to the service addresses for the control area.

9. The controller of claim 8, wherein the unique identifiers comprise any of Internet Protocol addresses, Media Access Control Address, and Virtual Local Area Network identifiers.

10. The controller of claim 6, wherein the controller comprising an SDN controller operating SDN applications.

11. A Software Defined Network (SDN), comprising:
a plurality of network elements comprising switch hardware providing network access to a plurality of users each uniquely identified by a unique identifier; and
a server operating an SDN application and communicatively coupled to the plurality of network elements;
wherein the SDN application is configured to:
monitor bandwidth usage for the plurality of users, wherein the plurality of users correspond to service addresses in a control area of an electric grid system;
detect abnormal bandwidth usage for a time period for one or more users of the plurality of users on the SDN network, which is a service provider network separate from the electric grid system;
determine whether the abnormal bandwidth usage for the one or more users indicates a power forecast adjustment is needed for the one or more users, wherein the power forecast adjustment is determined based on a correlation of bandwidth usage behavior for the plurality of users to power usage behavior for the plurality of users and the power forecast adjustment is based thereon;
notify an operator of the control area of the power forecast adjustment based on the abnormal bandwidth usage such that the operator adjusts power generation based on the notifying, wherein the plurality of users comprises a subset of users in the control area, and wherein the operator utilizes statistical sampling based on the notification for the power forecast adjustment
characterize bandwidth usage type for the one or more users; and
detect a condition of the one or more users based on the characterized bandwidth, wherein the condition comprises any of home on a work day, home from school on a school day, away from home, and returning to home.

* * * * *